(12) United States Patent
Michiaki et al.

(10) Patent No.: US 9,006,131 B2
(45) Date of Patent: Apr. 14, 2015

(54) COMPOSITE OXIDE FOR EXHAUST GAS PURIFICATION CATALYST, METHOD FOR MANUFACTURING THE SAME, COATING MATERIAL FOR EXHAUST GAS PURIFICATION CATALYST, AND FILTER FOR DIESEL EXHAUST GAS PURIFICATION

(75) Inventors: Yoshiyuki Michiaki, Okayama (JP); Yoshichika Horikawa, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 1042 days.

(21) Appl. No.: 13/121,526

(22) PCT Filed: Sep. 28, 2009

(86) PCT No.: PCT/JP2009/004951
§ 371 (c)(1),
(2), (4) Date: Mar. 29, 2011

(87) PCT Pub. No.: WO2010/038410
PCT Pub. Date: Apr. 8, 2010

(65) Prior Publication Data
US 2011/0176969 A1     Jul. 21, 2011

(30) Foreign Application Priority Data

Oct. 3, 2008    (JP) .................................. 2008-259066
Sep. 17, 2009   (JP) .................................. 2009-216042

(51) Int. Cl.
     *B01J 21/00*        (2006.01)
     *B01J 23/00*        (2006.01)
(Continued)

(52) U.S. Cl.
CPC .............. *B01J 23/002* (2013.01); *B01D 53/944* (2013.01); *B01D 2255/206* (2013.01); *B01D 2258/012* (2013.01); *B01J 23/18* (2013.01); *B01J 23/8437* (2013.01); *B01J 37/03* (2013.01);
(Continued)

(58) Field of Classification Search
USPC .................................. 502/304, 100, 300, 302
See application file for complete search history.

(56) References Cited

U.S. PATENT DOCUMENTS

2009/0288401 A1* 11/2009 Kaneshiro et al. ............. 60/299
2011/0027135 A1* 2/2011 Michiaki et al. ............. 422/171

FOREIGN PATENT DOCUMENTS

EP        0956899       11/1999
EP        1223164       7/2002
(Continued)

OTHER PUBLICATIONS

Egawa et al., "Soot Oxidation Catalysis by CeO2—Pr6O11—Bi2O3 Solid Solutions", pp. 142-143.
(Continued)

*Primary Examiner* — James McDonough
(74) *Attorney, Agent, or Firm* — Greenblum & Bernstein, P.L.C.

(57) ABSTRACT

A composite oxide for an exhaust gas purification catalyst is provided which can burn PM in diesel engine exhaust gas at low temperatures and has a good S desorption property. The composite oxide for an exhaust gas purification catalyst is composed of Ce, Bi, Pr, R, and oxygen in a molar ratio of Ce:Bi:Pr:R=(1−x−y−z):x:y:z. The ratios of Ce, Bi, Pr, and R satisfy $0<x+y+z\leq0.5$ and preferably $0<x\leq0.1$, $0<y\leq0.25$, and $0<z\leq0.3$. Particularly, when R is Zr, the composite oxide exhibits a good S desorption property at a temperature of about 600° C. and can recover its catalytic activity at low temperatures. Therefore, the exhaust gas purification catalyst is suitable as a PM combustion catalyst.

9 Claims, 6 Drawing Sheets

(51) Int. Cl.
  *B01J 25/00*  (2006.01)
  *B01J 29/00*  (2006.01)
  *B01J 23/10*  (2006.01)
  *B01D 53/94*  (2006.01)
  *B01J 23/18*  (2006.01)
  *B01J 23/843* (2006.01)
  *B01J 37/03*  (2006.01)
  *C09D 7/12*   (2006.01)
  *C08K 3/22*   (2006.01)
  *F01N 3/035*  (2006.01)

(52) U.S. Cl.
  CPC .............. *B01J 2523/00* (2013.01); *C08K 3/22* (2013.01); *C09D 7/1216* (2013.01); *F01N 3/035* (2013.01); *F01N 2570/04* (2013.01)

(56) References Cited

FOREIGN PATENT DOCUMENTS

| | | |
|---|---|---|
| EP | 1386661 | 2/2004 |
| EP | 2077253 | 7/2009 |
| JP | 6-211525 | 8/1994 |
| JP | 2003-238159 | 8/2003 |
| JP | 2006-224032 | 8/2006 |
| JP | 2009-195891 | 9/2009 |
| JP | 2009-233642 | 10/2009 |
| WO | 2008/050642 | 5/2008 |
| WO | 2008/065819 | 6/2008 |

OTHER PUBLICATIONS

Imanaka et al., "Novel catalysts for low-temperature combustion of diesel paticulate matter", Journal of Materials Chemistry, 2008, pp. 208-210.

Masui et al., "Development of Cerium . . . ", Catalysts & Catalysis, 2004, pp. 182-184.

Search report from WIPO, mail date is Dec. 22, 2009.

Search report from E.P.O. that issued with respect to patent family member European Patent Application No. 09817453.5, mail date is Dec. 28, 2011.

\* cited by examiner

COMPOSITE OXIDE FOR EXHAUST GAS PURIFICATION CATALYST, METHOD FOR MANUFACTURING THE SAME, COATING MATERIAL FOR EXHAUST GAS PURIFICATION CATALYST, AND FILTER FOR DIESEL EXHAUST GAS PURIFICATION

TECHNICAL FIELD

The present invention relates to an exhaust gas purification catalyst comprising a composite oxide suitable for burning PM (particulate matter) emitted from diesel engines of automobiles etc., to a method for manufacturing the same, to a catalytic coating material using the same, and to a diesel exhaust gas purification filter produced by coating a substrate with the coating material.

BACKGROUND ART

One problem with diesel engines is that the exhaust gas contains particulate matter (hereinafter may be referred to as "PM") that is composed mainly of nitrogen oxides (NOx) and carbon and causes environmental pollution. In one general method of removing PM that causes the problem, a diesel particulate filter (DPF) formed of a porous ceramic material is disposed in an exhaust gas passage to trap PM. Although the PM is accumulated in the DPF, the trapped PM is generally subjected to intermittent or continuous combustion treatment to remove the PM so that the DPF is regenerated to its original state before trapping of the PM.

General examples of the DPF regeneration treatment include a method in which PM is burned by forced heating from the outside using an electric heater, burner, and the like, and a method in which an oxidation catalyst is placed closer to the engine side than the DPF to convert NO contained in the exhaust gas to $NO_2$ so that the oxidizing ability of $NO_2$ is used to burn PM.

However, to use the electric heater or burner, an external power source must be provided. In addition, for example, a mechanism for actuating the electric heater etc. when the need for regeneration of the DPF arises must be provided separately. Accordingly, the exhaust gas purification system itself is complicated. When an oxidation catalyst is used, the combustion of PM may be insufficient in some cases because the temperature of the exhaust gas is not high enough for the catalyst to exhibit sufficient catalytic activity and because a sufficient amount of NO necessary for the combustion of PM can be obtained only under certain operating conditions.

A more preferred DPF regeneration treatment method that is being contemplated is to burn PM with its combustion start temperature reduced by the catalytic action of a catalyst supported on the DPF itself. The most preferred method is to burn the PM continuously at the temperature of the exhaust gas, and this is the ultimate goal.

At present, Pt, a catalyst metal, supported on high-specific surface area alumina or the like is used as an oxidation catalyst (PM combustion catalyst) for burning and removing PM trapped by a DPF. However, the catalytic action of Pt on the combustion of PM is low at the temperature level of is the exhaust gas from an engine. Therefore, may be difficult to burn PM continuously using the heat of the exhaust gas. Accordingly, means for forced heating from the outside must also be used. In addition, the price of Pt varies with the balance between supply and demand, and this can cause a problem of large fluctuations in cost.

A PM combustion catalyst may undergo a rapid temperature increase due to the heat generated by combustion of PM. Therefore, the PM combustion catalyst must have properties such that a reduction in catalytic performance (thermal degradation) after thermal history at high temperatures is as low as possible.

Patent Documents 1 to 3 disclose, as oxidation catalysts including a composite oxide of ceria as a base material and containing no noble metal element such as Pt, mixtures containing Ce, Bi, and an optional transition metal element.

Patent Document 1: Japanese Patent Application Laid-Open No. Hei 6-211525
Patent Document 2: Japanese Patent Application Laid-Open No. 2003-238159
Patent Document 3: Japanese Patent Application Laid-Open No. 2006-224032

DISCLOSURE OF THE INVENTION

Problems to be Solved by the Invention

A composite oxide containing Ce and Bi exhibits good catalytic activity on reduction in the combustion start temperature of PM at the beginning of use. However, there is the fear that the catalytic activity may be lowered during continuous use due to trace amounts of sulfur oxides contained in exhaust gas. For example, a Ce—Bi—Pr ternary composite oxide has the effect of lowering the combustion start temperature of PM but easily reacts with sulfur contained in fuel. This causes a problem in that the activity is lowered and not recovered in the exhaust gas atmosphere. The present inventors have found that the addition of one more element to such a composite oxide allows the catalytic activity to be recovered even during lower temperature heating.

The present invention has been made in view of the problems in the conventional technology and on the basis of the new finding. It is an object of the present invention to provide a composite oxide having a higher sulfur desorption property than the conventional composite oxides containing Ce and Bi. It is another object of the present invention to provide a composite oxide for an exhaust gas purification catalyst that exhibits only a small reduction in activity when poisoned by sulfur and can recover its catalytic activity at lower temperatures even when poisoned, a method for manufacturing the same, a coating material for the exhaust gas purification catalyst, and a diesel exhaust gas purification filter.

Means for Solving the Problems

The present inventors have made extensive studies to achieve the above objects and found that the above problems can be solved by a composite oxide including Ce, Bi, Pr, and a predetermined additional element. Thus, the present invention has been completed.

Accordingly, a composite oxide for an exhaust gas purification catalyst according to the present invention is one including Ce, Bi, Pr, and R (wherein R is at least one element selected from group 2, 3, 4, 8, 13, and 14 elements except for lanthanides and actinides), the composite oxide being represented by the following formula (1):

$$Ce_{1-x-y-z}Bi_xPr_yR_z \qquad (1)$$

(wherein x, y, and z satisfy $x+y+z \leq 0.5$).

The present invention also provides a coating material containing the composite oxide for an exhaust gas purification catalyst and a DPF produced by coating a porous filter with the coating material.

Effects of the Invention

According to the present invention, the addition of a predetermined element to Ce, Bi, and Pr provides a composite oxide having a higher sulfur desorption property than the conventional composite oxides containing Ce and Bi. Therefore, the present invention can provide a composite oxide for an exhaust gas purification catalyst that can easily recover its catalytic activity even when poisoned, a method for manufacturing the same, a coating material for the exhaust gas purification catalyst, and a diesel exhaust gas purification filter.

As described above, the reduction in catalytic activity due to sulfur poisoning can be recovered at relatively low temperatures. This leads to an advantage of an exhaust gas purification system because it is not necessary to install a large-scale apparatus for recovery of catalytic activity.

DESCRIPTION OF REFERENCE NUMERALS

Figure 1:
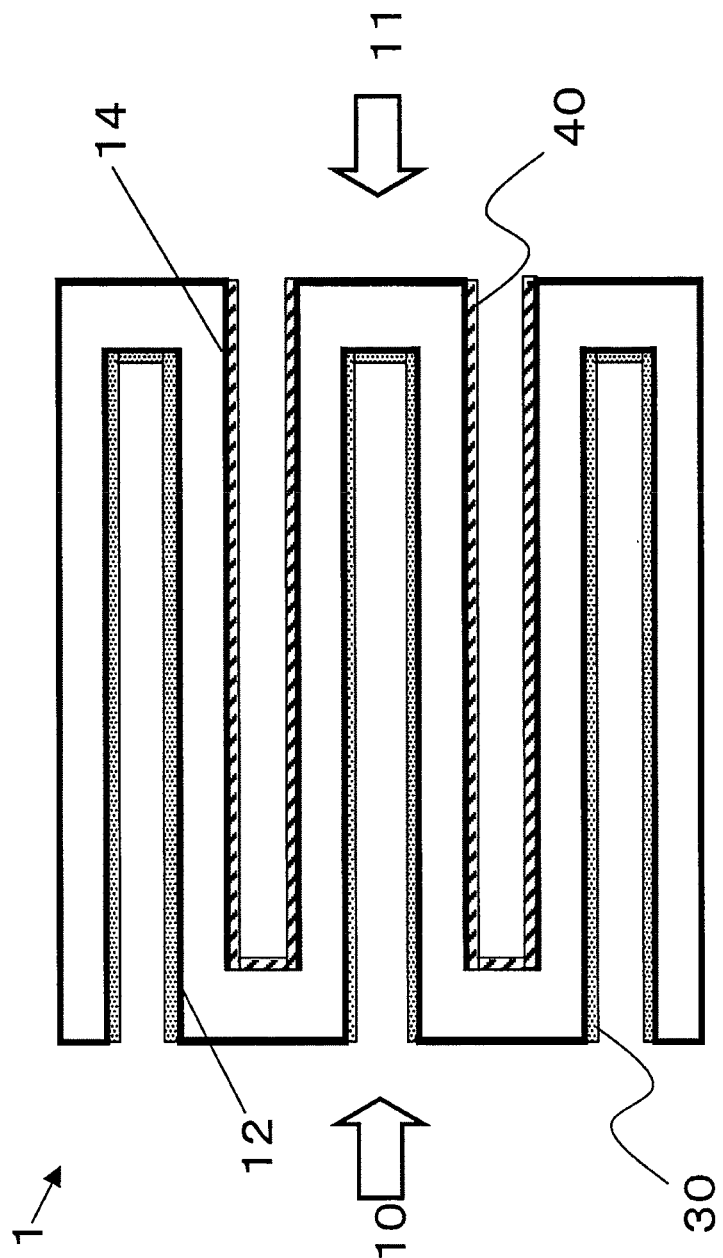
FIG. 1 is a diagram illustrating the structure of a DPF that uses a composite oxide of the present invention for an exhaust gas purification catalyst.

1 DPF
10 engine side
11 atmospheric open side
12 engine-side wall surface
14 atmospheric open-side wall surface
30 PM catalyst applied to engine-side wall surfaces
40 platinum-based catalyst applied to atmospheric open-side wall surfaces

BEST MODE FOR CARRYING OUT THE INVENTION

A composite oxide of the present invention for an exhaust gas purification catalyst is a composite oxide containing at least four elements including Ce, Bi, Pr, and R. R is at least one element selected from group 2, 3, 4, 8, 13, and 14 elements. With this composition, sulfur adsorbed on the composite oxide can be desorbed even at relatively low temperatures in an exhaust gas atmosphere, and the original catalytic activity can thereby be recovered.

When the molar ratio of Ce, Bi, Pr, and R that form the composite oxide of the present invention is denoted as Ce:Bi:Pr:R=(1−x−y−z):x:y:z, the ratios of these elements satisfy $0 < x+y+z \leq 0.5$.

Preferably, $0 < x \leq 0.1$, $0 < y \leq 0.25$, and $0 < z \leq 0.3$. Particularly preferably, $0 < z \leq 0.1$. In the above ranges, the initial PM combustion activity and the activity after heat resistant test are less likely to deteriorate. If the ratios are outside the above ranges, the initial activity deteriorates, and the sulfur desorption property is lowered. Therefore, even when the activity can be recovered, high temperature heat treatment must be performed.

In the composite oxide, Bi, Pr, or R that is not substituted for Ce in the structural unit of cerium oxide may be present as an impurity phase. The presence of the impurity phase is permitted so long as the effects of the present invention are not impaired. If the impurity phase in the allowable amount is present, it is sufficient that the molar ratios in the composite oxide as a whole including Ce, Bi, Pr, and R in the impurity phase satisfy the above ranges.

The composite oxide of the present invention is a composite oxide including Ce and Bi as base materials. Therefore, the mechanism of the catalytic activity that allows PM to burn at low temperatures may be the same as the mechanism assumed in conventional Ce—Bi based composite oxides.

More specifically, cations in the composite oxide composed mainly of Ce atoms undergo an apparent valence change, and lattice strains are generated due to substitution of Ce sites with different atoms such as Bi, Pr, and R having ionic radii different from the ionic radius of Ce. This allows oxygen in the lattice to be easily released therefrom. Therefore, active oxygen necessary for oxidation may be easily supplied even in a relatively low temperature range.

The presence of Pr and the lattice strains caused by substitution provide the effect of stabilizing the presence of Bi atoms in the crystal lattice and preventing Bi from being released. The presence of R serves as a particle growth inhibitor during synthesis, so that fine particles are generated. The presence of R may also prevent sintering of the particles, and heat resistance when the composite oxide is held at high temperatures for a long time may thereby be improved.

In an oxide having a cerium oxide structure, Bi exhibits the effect of improving the catalytic activity in a low temperature range, i.e., the effect of lowering the combustion start temperature of PM. The mechanism of this effect may be the same as that described above. Even when the amount of Bi added is relatively small, the effect of improving the catalytic activity in a low temperature range can be obtained. However, if an excessively large amount of Bi is added, the effect does not increase, but rather the catalyst material may fuse when exposed to high temperatures.

This may be because the addition of low-melting-point Bi lowers the melting point of the composite oxide. A suitable amount of Bi to be added can be determined from the combustion start temperature of PM in a sample exposed to high temperatures for a long time and a change in its crystal structure. The suitable amount was examined using the above evaluation method. As a result of the evaluation, the molar ratio of Bi added to the composite oxide is preferably within the range of $0 < x \leq 0.1$, as described above. When x exceeds 0.1, the combustion start temperature of PM in a sample exposed to high temperatures for a long time is likely to increase. In this case, Bi atoms may be easily released from the fluorite structure to form a heterogeneous phase such as a Bi oxide or a composite oxide of Bi and an additive element, so that the composite oxide may contain an impurity phase in an amount that impairs the effects of the present invention.

The present invention provides a novel composite oxide that contains Pr as a third element and R (at least one element selected from group 2, 3, 4, 8, 13, and 14 elements except for lanthanides and actinides) as a fourth element. Even when the amounts of Pr and R added are relatively small, a good heat resistance improving effect can be obtained. If the molar ratios of the third element and the fourth element added are large, the heat resistance improving effect is substantially maintained.

Therefore, the molar ratio of Pr added is preferably within the range of $0 < y \leq 0.25$, as described above. If the molar ratio of Pr added exceeds 0.25, the amount of adsorbed S after sulfur poisoning increases, and therefore the combustion start temperature of PM can increase.

The oxide of Pr has a fluorite structure similar to that of the cerium oxide ($CeO_2$). Partial substitution of Ce atoms with Pr allows the fluorite structure to be easily maintained, and an exhaust gas purification catalyst having improved heat resistance can be obtained.

R is at least one element selected from group 2, 3, 4 (Ti, Zr, Hf, and Rf), 8 (Fe, Ru, Os, and Hs), 13, and 14 elements except for lanthanides and actinides. Of these, elements that have the effect of suppressing sintering of primary particles during baking and are effective in increasing the specific surface area of the composite oxide are preferably used. More specifically, Zr and Fe, for example, are used. The increase in the specific surface area leads to an improvement in catalytic activity, so that the permissible level of sulfur poisoning is increased. This is due to an increase in the amount of sulfur required to cover the surfaces of particles.

Therefore, the addition of R provides the effect of suppressing deterioration of catalytic activity particularly due to sulfur poisoning. However, if an excessive amount of R is added, the fluorite structure cannot be maintained. Therefore, the amount of R added is preferably in the range of $0<z\leq0.3$, as described above. More preferably, the amount of R added may be limited to $0<z\leq0.1$.

It is also effective to use a platinum group element that can coexist with the composite oxide. Such a platinum group element has the effect of promoting the oxidation of fuel and unburned components such as NO and CO contained in the exhaust gas. It is also expected that the platinum group element provides the effect of further lowering the combustion start temperature of PM. At least one of platinum group elements (Pt, Rh, Pd, Ir, Ru, and Os) that can coexist with the composite oxide may be used. Particularly, Pt, Rh and Pd are more effective in improving the catalytic efficiency of the composite oxide. The platinum group element may be allowed to coexist with the composite oxide of the present invention by, for example, incorporating the platinum group element into the composite oxide.

The platinum group element may also be allowed to coexist with the composite oxide of the present invention by incorporating the platinum group element into a material generally used as a catalyst carrier such as $Al_2O_3$, $TiO_2$, or $SiO_2$ and mixing the resultant material with the composite oxide of the present invention. Preferably, the amount of the platinum group element is, for example, 0.05 to 5 percent by mass in the composite oxide of the present invention. When the catalyst carrier material is mixed thereto, the amount of the platinum group element is, for example, 0.05 to 5 percent by mass in the mixture of the composite oxide of the present invention and the catalyst carrier material.

To evaluate the heat resistance of a PM combustion catalyst subjected to long-term thermal history at high temperatures, it is effective to use, for example, a method in which a composite oxide synthesized by baking is subjected to high-temperature long-term heat treatment in air (hereinafter referred to as "heat resistant treatment") and then the change in catalytic activity on PM between just after the baking and after the heat resistant treatment is determined.

The catalytic activity on PM may be evaluated from, for example, PM combustion temperature described later. When the composite oxide is synthesized by baking at 800° C. for 2 hours, the composite oxide before being subjected to the heat resistant treatment has experienced only the thermal history at 800° C. for 2 hours.

To evaluate the poisoning resistance of the PM combustion catalyst exposed to sulfur oxides, it is effective to determine the change in catalytic activity of the synthesized PM combustion catalyst before and after exposure to a gas containing a small amount of sulfur for a predetermined time. The catalytic activity is evaluated from the PM combustion temperature as described above.

To evaluate the sulfur desorption property of the PM combustion catalyst, it is effective to use the following method. The PM combustion temperature is measured in advance, and the catalyst is brought into contact with a sulfur-containing gas for a predetermined time. Then the catalyst is subjected to sulfur desorption treatment in which the catalyst is exposed to a predetermined temperature for a short time. In this method, the PM combustion temperature is again measured and is compared with the initial PM combustion temperature. Hereinafter, this method is referred to as S purging treatment, and the sulfur desorption property is referred to as S purging property.

The catalyst of the present invention is excellent in the sulfur desorption property. Therefore, the performance after repeated sulfur desorption must be evaluated. To evaluate this performance, a sample is poisoned with a sulfur-containing gas and increased in temperature to perform S purging treatment. After this cycle is repeated predetermined times, the catalytic activity is measured.

The present inventors synthesized composite oxides including Ce, Bi, a third element, and a fourth element at different compositions using a method in which baking was performed at 800° C. for 2 hours and then determined the relationships between the structures of the oxides after heat resistant treatment, the rate of sulfur poisoning, and the degree of deterioration by sulfur. The results showed that the addition of the third and fourth elements increased the specific surface area by the BET method just after synthesis and decreased the change in the specific surface area by the BET method after the heat resistant treatment. The deterioration caused by sulfur poisoning was also evaluated, and the evaluation results showed that the rate of sulfur poisoning was small and that the degree of deterioration by sulfur could be reduced.

The powder properties of the composite oxide of the present invention will next be described. It is preferable that the specific surface area determined by the BET method be 10 to 100 $m^2/g$. If the specific surface area is less than 10 $m^2/g$, the catalytic activity is likely to be low. If the specific surface area exceeds 100 $m^2/g$, the degree of thermal degradation due to an increase in temperature during regeneration is greater than that expected to be suppressed by the effects of the third and fourth elements, and therefore the catalytic activity is likely to be lowered. In the particle size distribution measured by the laser diffraction method, the D50 diameter is preferably 0.01 to 10 µm. If the D50 diameter is less than 0.01 µm, the powder enters the inside of the DPF, and therefore a large amount of the powder must be used so that the powder is present on the surface of the DPF in an amount sufficient to exhibit catalytic activity. This is not preferable in terms of cost. If the D50 diameter exceeds 10 µm, the powder can clog the fine pores of the DPF, and this causes an increase in pressure loss, which is not preferred.

The composite oxide of the present invention can be preferably synthesized by a method in which a precipitated material obtained by a wet process is baked. For example, water-soluble salts of Ce, Bi, Pr, and R (for example, Zr) are precipitated using a precipitant, and air is blown into the mixture to oxidize the precipitates. Then the precipitates are dried to obtain a "precursor" of the composite oxide, and the precursor is subjected to heat treatment to synthesize the composite oxide.

More specifically, an alkali used as a precipitant is added to and reacted with an aqueous solution containing a water-soluble salt (for example, nitrate) of Ce, a water-soluble salt (for example, nitrate) of Bi, a water-soluble salt (for example, nitrate) of Pr, and a water-soluble salt of R, and air is blown into the mixture to oxidize the salts to generate a mixture of the oxides. The obtained precipitated product is filtrated, washed, and dried to obtain a precursor. The upper limits of the concentrations of the ions of Ce, Bi, Pr, and R in the solution in which the precipitates are formed are determined by their solubilities. However, when the concentrations in the solution are too high, the reaction may not proceed uniformly during stirring, and the mixture may be non-uniform. In addition, the load on the apparatus used during stirring can be excessively large. Therefore, excessively high concentrations are not preferred.

Preferably, one or both of an alkali hydroxide and an alkali carbonate are used to obtain the precipitates. Specific examples of the alkali hydroxide include sodium hydroxide and ammonia water. A mixture of a substance composed mainly of carbon dioxide such as carbonated water, carbon dioxide gas, sodium carbonate, potassium carbonate, or sodium hydrogencarbonate and ammonia water or a water soluble ammonium salt is preferably used as the alkali carbonate. Alternatively, it is preferable to use an ammonium carbonate compound having the functions of the alkali hydroxide and the alkali carbonate. Specific examples of such an ammonium carbonate compound include ammonium carbonate and ammonium hydrogencarbonate.

The precipitates can also be obtained by heating a salt solution containing urea to decompose the urea. In this process, ammonia is generated, and the solution is thereby made alkaline. Preferably, the pH of the solution when the precipitates are generated is controlled within the range of 6 to 11. The region in which the pH is less than 6 is not preferred because Bi, Ce, Pr, and R may not co-precipitate.

In an alternative method, a hydrolyzable Ce compound, a hydrolyzable Bi compound, a hydrolyzable Pr compound, and a hydrolyzable R compound are prepared. These compounds are added to water and hydrolyzed to form a sol mixture, and the sol mixture is subjected to coagulation and precipitation. Examples of the hydrolyzable compounds include alkoxides and β-keto acid salts of the respective metal elements.

The obtained precipitates are, if necessary, filtrated, washed with water, and vacuum or air dried to give a precursor. In this process, to improve the dewatering effect of drying, the precipitates may be dried immediately after filtration or after granulated into a predetermined shape. Then the precursor in a powder or granular form is subjected to heat treatment (baking) at, for example, 400 to 1,000° C. and preferably 500 to 850° C. to synthesize the target composite oxide. No particular limitation is imposed on the atmosphere during baking so long as the composite oxide can be generated. Examples of the usable atmosphere include air, nitrogen, argon and combinations thereof with water vapor.

When a platinum group element is added to the composite oxide of the present invention, for example, a method can be used in which the baked composite oxide is impregnated with a salt or complex containing the platinum group element in a target amount and then the mixture is dried and baked.

A coating material for an exhaust gas purification catalyst and a DPF using the same can be produced using the composite oxide of the invention as the exhaust gas purification catalyst. The exhaust gas purification catalyst coating material contains the exhaust gas purification catalyst of the present invention, a solvent, and an inorganic binder. If necessary, the coating material may contain a dispersant, a viscosity modifier, and a pH modifier.

Any of a polar solvent and a non-polar solvent may be used as the solvent. A solvent having a low boiling point is preferred because it can be dried quickly after application to a filter. However, a water-based solvent may be used because of its ease of handling. Specific examples of the solvent preferably used include water, isopropyl alcohol, terpineol, 2-octanol, and butyl carbitol acetate.

A powder of $Al_2O_3$, $TiO_2$, $SiO_2$, and the like can be preferably used as the inorganic binder. Since the PM catalyst is exposed to high temperatures, a material having stable properties even at high temperatures is preferred.

No particular limitation is imposed on the structure of the DPF that uses the composite oxide of the present invention. FIG. 1 shows an example of the DPF. The DPF 1 has a tubular shape, and its cross-section as viewed from an inlet side 10 has a honeycomb structure. The material for the DPF 1 is porous ceramic. No direct through-hole is provided between the inlet side (also referred to as an engine side) 10 and an outlet side (also referred to as an atmospheric open side) 11, and the porous ceramic itself serves as a filter. Specific examples of the porous ceramic preferably used include ceramics, cordierite, silicon carbide, and aluminum titanate. In addition to the structure shown in FIG. 1, any of a foamed body, a mesh shape, and a plate shape may be used.

Preferably, the composite oxide of the present invention is disposed on the engine side 10 of the DPF. This is because, since the composite oxide is a PM catalyst, the combustion temperature of PM is not lowered if the catalyst is not on the engine side on which the PM is accumulated. A platinum-based catalyst may be disposed on the atmospheric open side of the PM catalyst of the present invention. For example, a multilayer structure may be used in which a layer of the platinum-based catalyst and a layer of the PM catalyst of the present invention are separately applied to the engine-side wall surfaces 12 of the DPF.

The coating material of the present invention for the exhaust gas purification catalyst may be applied to the engine-side wall surfaces 12, and a platinum-based catalyst coating material may be applied to the atmospheric open-side wall surfaces 14. In this case, the PM catalyst 30 is disposed on the engine side, and the platinum-based catalyst 40 is disposed on the atmospheric open side. A mixture of the coating material of the present invention for the exhaust gas purification catalyst and a powder of the platinum-based catalyst may be applied. The platinum based catalyst is a catalyst in which a platinum group element is used.

EXAMPLES

Examples will next be described in detail.
<Production of Composite Oxides>
Composite oxides of Examples and a Comparative Example were produced as follows.

Example 1

Cerium nitrate hexahydrate ($Ce(NO_3)_3.6H_2O$) and bismuth nitrate pentahydrate ($Bi(NO_3)_3.5H_2O$) were prepared as a Ce source and a Bi source, respectively. Separately, a powder of praseodymium oxide as a rare-earth oxide was dissolved in a concentrated nitric acid solution to prepare a nitric acid solution of Pr.

Ferric nitrate nonahydrate ($Fe(NO_3)_3.9H_2O$) used as an R source was mixed therewith in a molar ratio of Ce:Bi:Pr:Fe=0.7:0.1:0.1:0.1, and then water was added thereto such that the total amount of Ce, Bi, Pr, and R in the mixed nitric acid solution was 0.2 mol/L, whereby a starting material solution was obtained. An aqueous NaOH solution used as a precipitant was added to the starting material solution under stirring to obtain the precipitates of hydroxides.

Then a sufficient amount of air was blown into the mixture at high temperatures (50° C. or higher) to convert the hydroxides to stable oxides. The obtained precipitates were filtrated, washed with water, and dried at 125° C. for about 15 hours to give a dry powder (hereinafter referred to as a "precursor"). Then the precursor was baked in an air atmosphere at 800° C. for 2 hours to obtain a composite oxide composed mainly of Ce, Bi, Pr, and Fe.

Comparative Example 1

Cerium nitrate hexahydrate ($Ce(NO_3)3.6H_2O$) and bismuth nitrate pentahydrate ($Bi(NO_3)_3.5H_2O$) were prepared as a Ce source and a Bi source, respectively. Separately, a powder of praseodymium oxide as a rare-earth oxide was dissolved in a concentrated nitric acid solution to prepare a nitric acid solution of Pr.

The above-prepared nitrates and the nitric acid solution of Pr were mixed such that the molar ratio of Ce, Bi, and Pr was 0.8:0.1:0.1, and then water was added thereto such that the total amount of Ce, Bi, and Pr in the mixed nitric acid solution was 0.2 mol/L, whereby a starting material solution was obtained. An aqueous ammonium carbonate solution used as a precipitant was added to the obtained solution under stirring. The stirring was continued for 30 minutes so that the precipitation reaction proceeded sufficiently. The obtained precipitates were filtrated, washed with water, and dried at 125° C. for about 15 hours to give a dry powder. The obtained powder is referred to as a precursor. Next, the precursor was baked in an air atmosphere at 800° C. for 2 hours to obtain a composite oxide composed mainly of Ce, Bi, and Pr.

<Production of Heat Resistance Evaluation Samples>

To evaluate the heat resistance of the obtained composite oxides, part of each composite oxide was subjected to heat treatment (heat resistant treatment) in an electric furnace in air at 800° C. for 100 hours.

<Measurement of Specific Surface Area by the BET Method>

The samples before the heat resistant treatment (represented as 800° C.×2 h) obtained in Example 1 and Comparative Example 1 and the samples after the heat resistant treatment (represented as 800° C.×100 h) were pulverized in agate mortars to obtain powders, and then the specific surface area of each powder was determined by the BET method. The measurements were performed using 4 Sorb US (product of Yuasa Ionics Inc.).

Evaluation of PM Combustion Temperature>

The samples obtained in Example 1 and Comparative Example 1 and the samples after the heat resistant treatment were separately mixed with carbon black to prepare powder mixtures. A predetermined amount of each powder mixture was sampled, and its carbon black combustion temperature was determined using a TG/DTA apparatus to evaluate the PM combustion start temperature. More specifically, the following procedure was used.

Commercially available carbon black (product of Mitsubishi Chemical Corporation, average particle size: 2.09 μm) was used as model PM. The powder of a composite oxide sample and the carbon black were weighed in a mass ratio of 6:1 and mixed in an automatic mortar (model AGA, product of Ishikawa Kojo) for 20 minutes to obtain a powder mixture of the carbon black and the powder of the sample. 20 mg of the powder mixture was placed in a TG/DTA apparatus (Model TG/DTA 6300, product of Seiko Instruments Inc.) and heated from room temperature to 700° C. in air at a heating rate of 10° C./min, and the amount of weight reduction was measured (since the carbon black is converted to carbon dioxide by combustion and discharged from the system, the weight tends to decrease from the initial weight).

Figure 2:
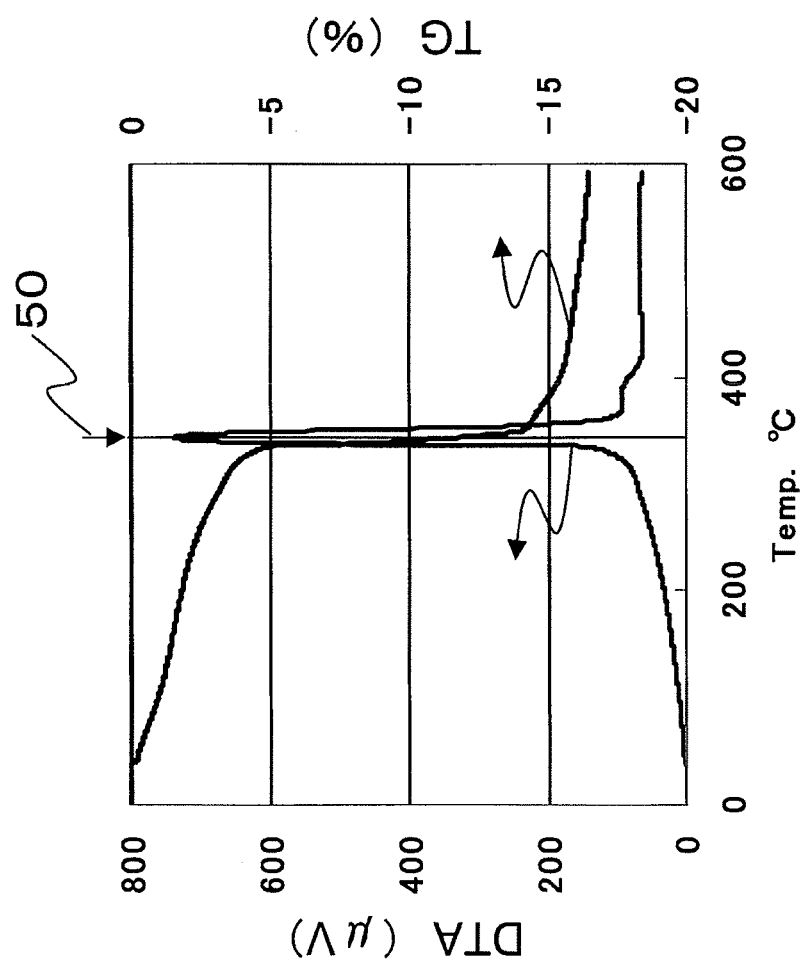
FIG. 2 is a graph showing a TG curve.

FIG. 2 schematically shows a weight change curve (a TG curve) and a differential thermal curve (a DTA curve). A point on the DTA curve at which the amount of heat generated was largest was used as the PM combustion temperature. In the figure, this temperature is denoted by reference numeral 50.

<Evaluation of Sulfur Poisoning>

The samples obtained in Example 1 and Comparative Example 1 were left to stand in an environment containing $SO_2$ gas with a concentration of 200 ppm, 10 vol % of oxygen, and 10 vol % of water vapor at a flow rate of 500 mL/min for 10 hours, and the samples were thereby poisoned. Then powder mixtures of the samples and carbon black were produced. A predetermined amount of each powder mixture was sampled, and its carbon black combustion temperature was determined using the TG/DTA apparatus to evaluate the PM combustion temperature.

<Evaluation of S Purging Property>

The samples obtained in Example 1 and Comparative Example 1 were left to stand in an environment containing $SO_2$ gas with a concentration of 200 ppm, 10 vol % of oxygen, and 10 vol % of water vapor at a flow rate of 500 mL/min for 10 hours, and the samples were thereby poisoned. Then the samples were subjected to S purging treatment by exposure to an environment containing NO gas with a concentration of 580 ppm, CO gas with a concentration of 20,000 ppm, 16% of $CO_2$ gas, 6,200 ppm of propylene gas, 1.95 vol % of oxygen, and 10 vol % of water vapor at a flow rate of 3 L/min at 650° C. or 600° C. for 10 minutes. Then the PM combustion temperature was measured.

<Evaluation of the Amount of Adsorbed S>

3 g of each of the samples obtained in Example 1 and Comparative Example 1 was weighed. Each weighed sample was left to stand in an environment containing $SO_2$ gas with a concentration of 200 ppm at a flow rate of 500 mL/min for 10 hours, and the sample was thereby poisoned. Each poisoned sample was weighed to determine the ratio (mass %) of the adsorbed S. Next, each sample was subjected to purging treatment by exposure to an environment containing NO gas with a concentration of 580 ppm, CO gas with a concentration of 20,000 ppm, 16% of $CO_2$ gas, 6,200 ppm of propylene gas, 1.95 vol % of oxygen, and 10 vol % of water vapor at a flow rate of 3 L/min at 650° C. or 600° C. for 10 minutes. Then the sample was weighed.

<Measurement Results>

The molar ratios of the added elements and the results for the PM combustion temperature, the amount of adsorbed S, and the specific surface area are shown in Table 1 for each of the composite oxides in Example 1 and Comparative Example 1. The sample in Comparative Example 1 was produced by the same method as the method of producing the catalyst of the present invention but does not contain R.

In the composite oxide of the present invention, the initial combustion temperature characteristics were substantially equal to or slightly higher than those in Comparative Example 1. These characteristics were higher when R was Zr. However, this tendency of these characteristics was not observed in the sulfur resistance. After exposure to sulfur-containing gas for 10 hours, the PM combustion temperatures in Example 1 and Comparative Example 1 were substantially the same.

With the purging treatment at 650° C. for 10 minutes performed after poisoning with sulfur-containing gas for 10 hours, the S purging property was little different between Example 1 and Comparative Example 1. However, with the purging treatment at 600° C. for 10 minutes, the PM combustion temperature in Example 1 was 379° C., and the PM combustion temperature in Comparative Example 1 was 403° C. This indicates that the addition of Fe as the fourth element to the Ce—Bi—Pr ternary catalyst can recover the catalytic activity at lower purging temperatures in a more effective manner.

The heat resistance characteristics were higher in each Example than in the Comparative Example. However, the levels of these resistance characteristics do not cause any practical problem.

Referring to Table 1, the amount of adsorbed S was substantially the same in Example 1 and Comparative Example 1. Particularly, when the samples were poisoned for 10 hours and regenerated at 600° C., the amount of remaining adsorbed S was less than that in Comparative Example 1. This reflects the high S purging property at 600° C.

Example 2

A composite oxide in this example was obtained by repeating the same procedure as in Example 1 except that zirconium oxynitrate dihydrate ($ZrO(NO_3)_2 \cdot 2H_2O$) used as an R source was mixed such that the molar ratio of Ce, Bi, Pr, and Zr was 0.75:0.1:0.1:0.05.

Example 3

A composite oxide in this example was obtained by repeating the same procedure as in Example 1 except that zirconium oxynitrate dihydrate ($ZrO(NO_3)_2 \cdot 2H_2O$) used as an R source was mixed such that the molar ratio of Ce, Bi, Pr, and Zr was 0.7:0.1:0.1:0.1.

Example 4

A composite oxide in this example was obtained by repeating the same procedure as in Example 1 except that zirconium oxynitrate dihydrate ($ZrO(NO_3)_2 \cdot 2H_2O$) used as an R source was mixed such that the molar ratio of Ce, Bi, Pr, and Zr was 0.65:0.1:0.1:0.15.

Example 5

A composite oxide in this example was obtained by repeating the same procedure as in Example 1 except that zirconium oxynitrate dihydrate ($ZrO(NO_3)_2 \cdot 2H_2O$) used as an R source was mixed such that the molar ratio of Ce, Bi, Pr, and Zr was 0.6:0.1:0.1:0.2.

<Production of Heat Resistance Evaluation Samples>

To evaluate the heat resistance of the obtained composite oxides, part of each composite oxide was subjected to heat treatment (heat resistant treatment) in an electric furnace in air at 800° C. for 100 hours.

<Measurement of Specific Surface Area by the BET Method>

The specific surface area by the BET method was determined for each of Examples 2 to 5 by the same procedure as in Example 1.

<Evaluation of PM Combustion Temperature>

The PM combustion start temperature was evaluated for each of Examples 2 to 5 by the same procedure as in Example 1.

<Evaluation of Sulfur Poisoning>

The PM combustion temperature was evaluated for each of Examples 2 to 5 by the same procedure as in Example 1.

<Evaluation of S Purging Property>

The sample obtained in each Example was subjected to the same treatment as in Example 1. More specifically, each sample was left to stand in an environment containing $SO_2$ gas with a concentration of 200 ppm, 10 vol % of oxygen, and 10 vol % of water vapor at a flow rate of 500 mL/min for 10 hours, and the sample was thereby poisoned. Then the sample was subjected to purging treatment by exposure to an environment containing NO gas with a concentration of 580 ppm, CO gas with a concentration of 20,000 ppm, 16% of $CO_2$ gas, 6,200 ppm of propylene gas, 1.95 vol % of oxygen, and 10 vol % of water vapor at a flow rate of 3 L/min at 600° C. for 10 minutes. Then the PM combustion temperature was measured. In Example 3, the S purging treatment at an exposure temperature of 650° C. was also performed as in Example 1.

<Evaluation of the Amount of Adsorbed S>

The sample obtained in each Example was subjected to the same treatment as in Example 1. More specifically, first, 3 g of each sample was weighed. Each weighed sample was left to stand in an environment containing $SO_2$ gas with a concentration of 200 ppm at a flow rate of 500 mL/min for 10 hours, and the sample was thereby poisoned. Each poisoned sample was weighed to determine the ratio (mass %) of the adsorbed S. Next, each sample was subjected to purging treatment by exposure to an environment containing NO gas with a concentration of 580 ppm, CO gas with a concentration of 20,000 ppm, 16% of $CO_2$ gas, 6,200 ppm of propylene gas, 1.95 vol % of oxygen, and 10 vol % of water vapor at a flow rate of 3 L/min at 600° C. for 10 minutes. Then the sample was weighed.

<Measurement Results>

Figure 3:
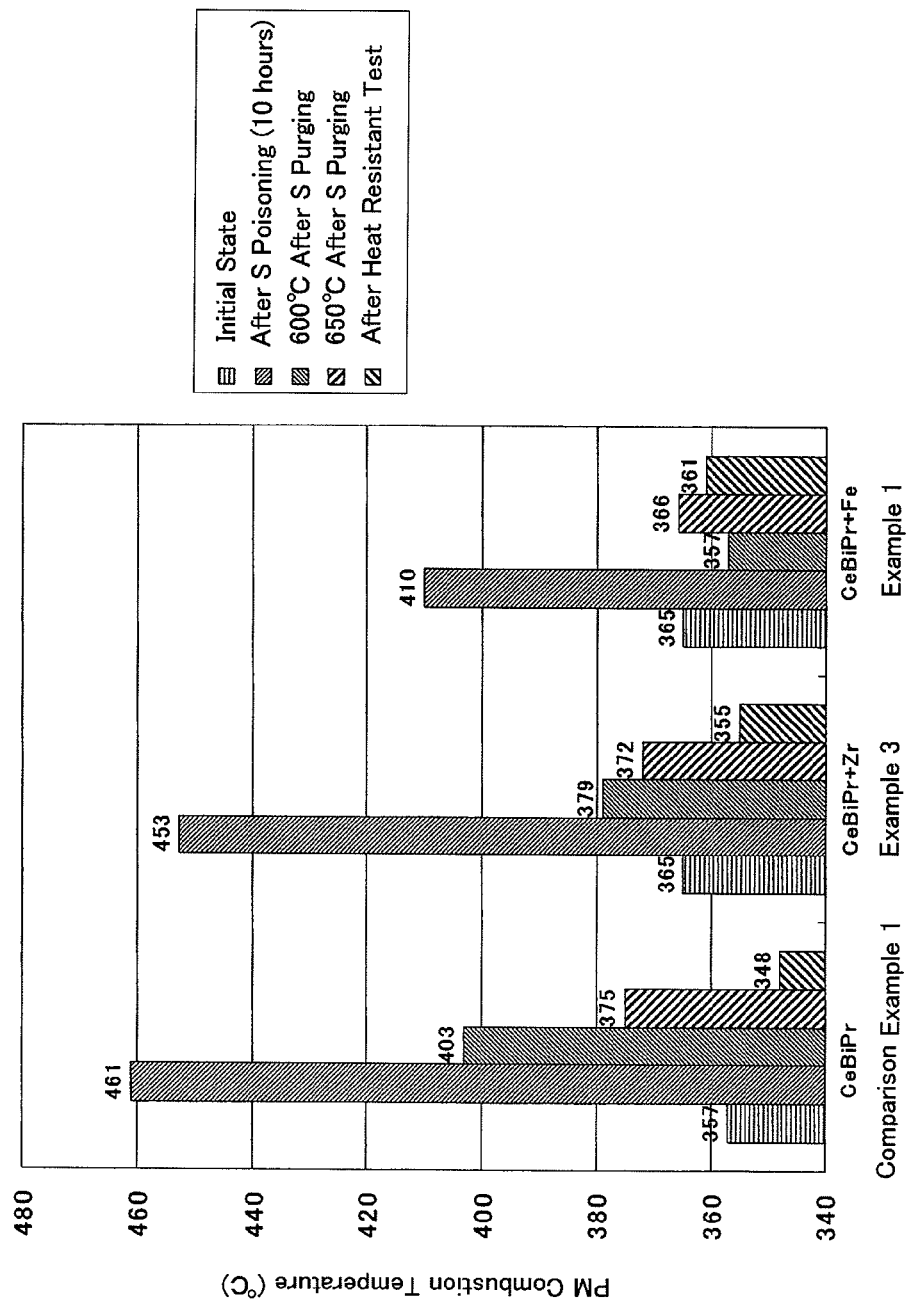
FIG. 3 is a graph that compares PM combustion temperatures in Examples 1 and 3 and Comparative Example 1.
Figure 4:
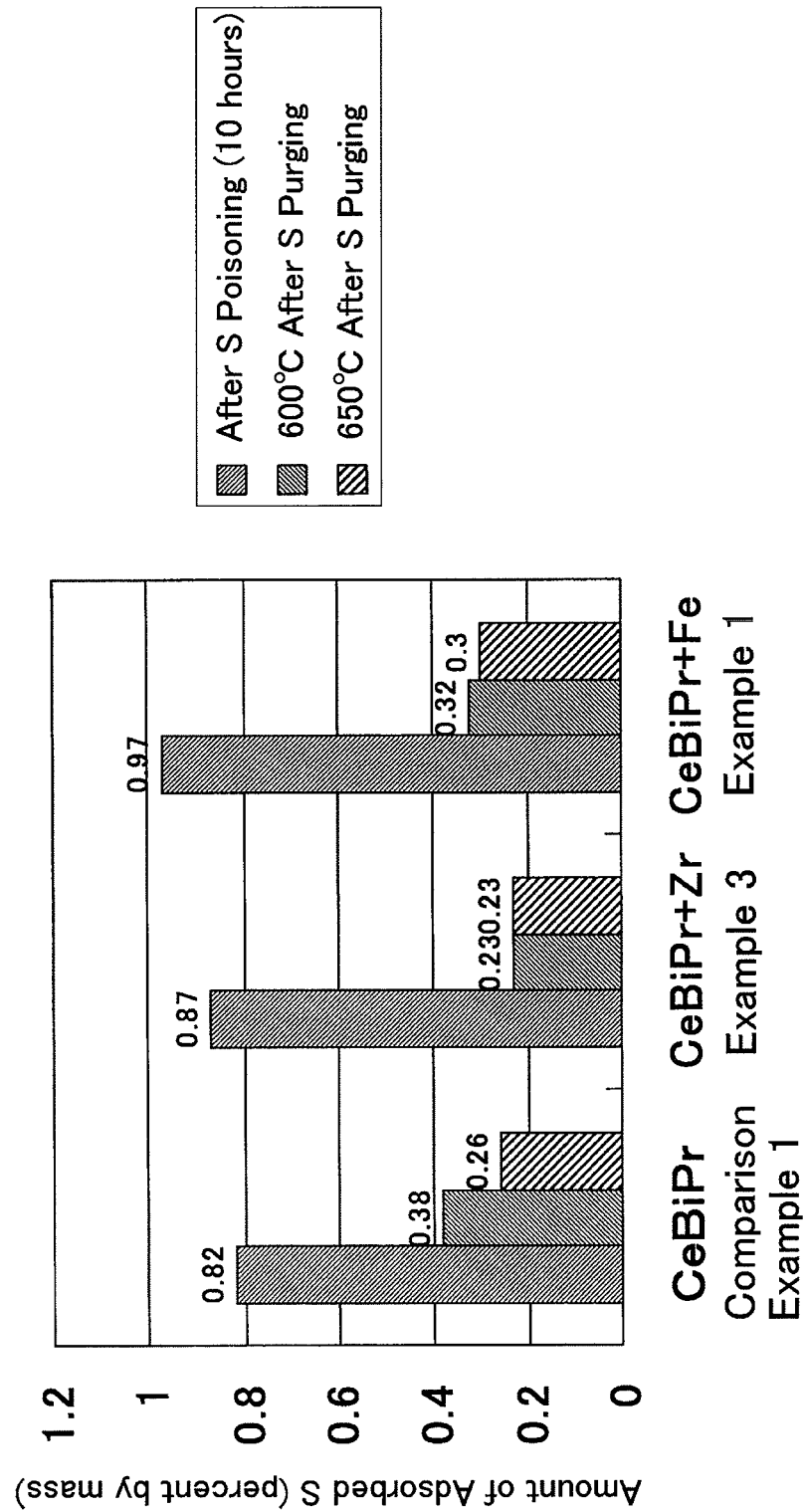
FIG. 4 is a graph that compares the amounts of adsorbed S in Examples 1 and 3 and Comparative Example 1.

The molar ratios of the elements added and the results for the PM combustion temperature, the amount of adsorbed S, and the specific surface area are shown in Table 1 for each of the composite oxides in Examples 1 to 5 and Comparative Example 1. The graphs for the PM combustion temperature and the amount of adsorbed S are shown in FIGS. 3 and 4 for Examples 1 and 3 and Comparative Example 1. In Table 1, a value in parentheses represents treatment time.

TABLE 1

| | Composition of Catalyst Molar Ratio | | | | | PM Combustion Temperature (° C.) | | | | | Amount of Adsorbed S (percent by mass) | | | BET(m2/g) | |
|---|---|---|---|---|---|---|---|---|---|---|---|---|---|---|---|
| | | | | | | Initial State | After S Poisoning (10 hours) | After S Purging (10 min.) 600° C. | After S Purging (10 min.) 650° C. | After Heat Resistant Treatment (100 hours) | After S Poisoning (10 hours) | After S Purging (10 min.) 600° C. | After S Purging (10 min.) 650° C. | Initial State | After Heat Resistant Treatment (100 hours) |
| | Ce | Bi | Pr | Zr | Fe | | | | | | | | | | |
| Example 1 | 0.70 | 0.10 | 0.10 | — | 0.10 | 365 | 410 | 357 | 366 | 361 | 0.97 | 0.32 | 0.30 | 35.1 | 23.2 |
| Example 2 | 0.75 | 0.10 | 0.10 | 0.05 | — | 358 | 452 | 370 | — | 347 | 0.81 | 0.26 | — | 35.8 | 33.9 |
| Example 3 | 0.70 | 0.10 | 0.10 | 0.10 | — | 365 | 453 | 379 | 372 | 355 | 0.87 | 0.23 | 0.23 | 39.0 | 38.3 |

TABLE 1-continued

| | Composition of Catalyst Molar Ratio | | | | | | PM Combustion Temperature (° C.) | | | | | Amount of Adsorbed S (percent by mass) | | | | BET(m2/g) | |
| | | | | | | | | After S Poisoning (10 hours) | After S Purging (10 min.) | | After Heat Resistant Treatment (100 hours) | After S Poisoning (10 hours) | After S Purging (10 min.) | | | After Heat Resistant Treatment (100 hours) |
| | Ce | Bi | Pr | Zr | Fe | Initial State | | | 600° C. | 650° C. | | | 600° C. | 650° C. | Initial State | |
|---|---|---|---|---|---|---|---|---|---|---|---|---|---|---|---|---|
| Example 4 | 0.65 | 0.10 | 0.10 | 0.15 | — | 372 | 446 | 363 | — | 354 | 0.93 | 0.18 | — | 38.7 | 37.4 |
| Example 5 | 0.60 | 0.10 | 0.10 | 0.20 | — | 378 | 441 | 367 | — | 361 | 0.83 | 0.15 | — | 34.4 | 34.1 |
| Comparative Example 1 | 0.80 | 0.10 | 0.10 | — | — | 357 | 461 | 403 | 375 | 348 | 0.82 | 0.38 | 0.26 | 31.1 | 28.0 |

* A value in parentheses represents treatment time.

In the composite oxides of the present invention, the initial combustion temperature characteristics were substantially equal to or higher than those in Comparative Example 1. These characteristics were higher when R was Zr. However, this tendency of these characteristics was not observed in the sulfur resistance. After exposure to sulfur-containing gas for 10 hours, the PM combustion temperatures in Examples 1 to 5 were slightly lower than the PM combustion temperature in Comparative Example 1.

With the purging treatment at 600° C. for 10 minutes performed after poisoning with sulfur-containing gas for 10 hours, the temperature indicating the S purging property was 357° C. in Example 1 and 379° C. in Example 3 but was 403° C. in Comparative Example 1. This shows that the addition of Fe or Zr as the fourth element to the Ce—Bi—Pr ternary catalyst can recover the catalytic activity at lower purging temperatures in a more effective manner. Similar results were obtained for the purging treatment at 650° C. for 10 minutes.

The heat resistance characteristics were higher in each Example than in the Comparative Example.
However, the levels of these resistance characteristics do not cause any practical problem.

The amount of adsorbed S was substantially the same in Example 1 and Comparative Example 1. Particularly, when the samples were poisoned for 10 hours and regenerated at 600° C., the amount of remaining adsorbed S was less than that in Comparative Example 1. This reflects the high S purging property at 600° C.

As described above, the composite oxides of the present invention for an exhaust gas purification catalyst can recover their catalytic activities lowered by sulfur poisoning in a more efficient manner at low temperatures.

Example 6

A composite oxide in this example was obtained by repeating the same procedure as in Example 1 except that zirconium oxynitrate dihydrate ($ZrO(NO_3)_2 \cdot 2H_2O$) used as an R source was mixed such that the molar ratio of Ce, Bi, Pr, and Zr was 0.749:0.001:0.20:0.05.

<Measurement of Specific Surface Area by the BET Method>
The specific surface area by the BET method was determined for Example 6 by the same procedure as in Example 1.

<Evaluation of PM Combustion Temperature>
The PM combustion temperatures of the samples obtained in Comparative Example 1 and Example 6 were evaluated. More specifically, the following procedure was used.

Commercially available carbon black (product of Mitsubishi Chemical Corporation, average particle size: 2.09 μm) was used as model PM. The powder of a composite oxide sample and the carbon black were weighed in a mass ratio of 30:1 and mixed in a micro tube having a volume of 1.5 mL for 3 min using a test tube mixer TRIO (model TM-1, product of AS ONE Corporation) to obtain a powder mixture of the carbon black and the powder of the sample. 10 mg of the powder mixture was placed in a TG/DTA apparatus (Model TG/DTA 6300, product of Seiko Instruments Inc.) and heated from room temperature to 800° C. in air at a heating rate of 10° C./min, and the amount of weight reduction was measured.

<Evaluation of Sulfur Poisoning>
The PM combustion temperatures of the samples obtained in Comparative Example 1 and Example 6 were evaluated. More specifically, the following procedure was used.

The samples were left to stand in an environment containing $SO_2$ gas with a concentration of 500 ppm, 10 vol % of oxygen, and 10 vol % of water vapor at a flow rate of 100 mL/min for 5 hours, and the samples were thereby poisoned. Then powder mixtures of the samples and carbon black were produced. A predetermined amount of each powder mixture was sampled, and its carbon black combustion temperature was determined using the TG/DTA apparatus to evaluate the PM combustion temperature.

<Evaluation of S Purging Property>
The sample obtained in Example 6 was subjected to the same treatment as in Comparative Example 1. More specifically, the sample was first left to stand in an environment containing $SO_2$ gas with a concentration of 500 ppm, 10 vol % of oxygen, and 10 vol % of water vapor at a flow rate of 100 mL/min for 5 hours, and the sample was thereby poisoned. Then the sample was subjected to purging treatment by exposure to an environment containing NO gas with a concentration of 580 ppm, CO gas with a concentration of 20,000 ppm, 16% of $CO_2$ gas, 6,200 ppm of propylene gas, 1.95 vol % of oxygen, and 10 vol % of water vapor at a flow rate of 3 L/min at 600° C. for 10 minutes. Then the PM combustion temperature was measured.

<Evaluation of the Amount of Adsorbed S>
The sample obtained in Example 6 was subjected to the same treatment as in Comparative Example 1. More specifically, first, 1.8 g of the sample was weighed. The weighed sample was left to stand in an environment containing $SO_2$ gas with a concentration of 500 ppm at a flow rate of 100 mL/min for 5 hours, and the sample was thereby poisoned. The poisoned sample was weighed to determine the ratio (mass %) of the adsorbed S. Next, the sample was subjected to purging treatment by exposure to an environment containing NO gas with a concentration of 580 ppm, CO gas with a concentration of 20,000 ppm, 16% of $CO_2$ gas, 6,200 ppm of propylene gas, 1.95 vol % of oxygen, and 10 vol % of water vapor at a flow rate of 3 L/min at 600° C. for 10 minutes. Then the sample was weighed.

<Evaluation of the Amount of Adsorbed S Per Unit Specific Surface Area by the BET Method>

The determined amount of adsorbed S was divided by the specific surface area of the composite oxide sample to compute the amount of adsorbed S per unit specific surface area, and the results were evaluated.

<Measurement Results>

The added molar ratios of the elements and the results for the PM combustion temperature, the amount of adsorbed S, the amount of adsorbed S per unit specific surface area by the BET method, and the specific surface area are shown in Table 2 for each of the composite oxides in Example 6 and Comparative Example 1. In Table 2, a value in parentheses represents treatment time.

Comparative Example 1. This clearly shows that the composite oxide in Example 6, which is one of the Examples of the present invention, has a good S purging property at 600° C.

As described above, the composite oxides of the present invention for exhaust gas purification can recover their catalytic activity lowered by sulfur poisoning. Particularly, when the amount of Bi is smaller, the catalytic activity is less likely to be lowered even during sulfur poisoning.

INDUSTRIAL APPLICABILITY

The present invention is suitably used for exhaust gas filters (DPF) for diesel engines.

The invention claimed is:

1. A composite oxide comprising Ce, Bi, Pr, and R (wherein R is at least one element selected from group 2, 3, 4,

TABLE 2

| Composition of Catalyst Molar Ratio | | | | | PM combustion temperature (° C.) | | | Amount of Adsorbed S (percent by mass) | | Amount of Adsorbed S per Unit Specific Surface Area by the BET method | | |
|---|---|---|---|---|---|---|---|---|---|---|---|---|
| | | | | | | After S Poisoning | After S Purging | After S Poisoning | After S Purging | After S Poisoning | After S Purging | |
| Ce | Bi | Pr | Zr | Initial State | (5 hours) | 600° C. | (5 hours) | 600° C. | (5 hours) | 600° C. | BET (m²/g) Initial State |
| Example 6 | 0.749 | 0.001 | 0.20 | 0.05 | 406 | 487 | 435 | 1.65 | 0.45 | 0.035 | 0.010 | 47.1 |
| Comparative Example 1 | 0.80 | 0.10 | 0.10 | — | 372 | 524 | 453 | 1.11 | 0.49 | 0.036 | 0.016 | 31.1 |

Figure 5:
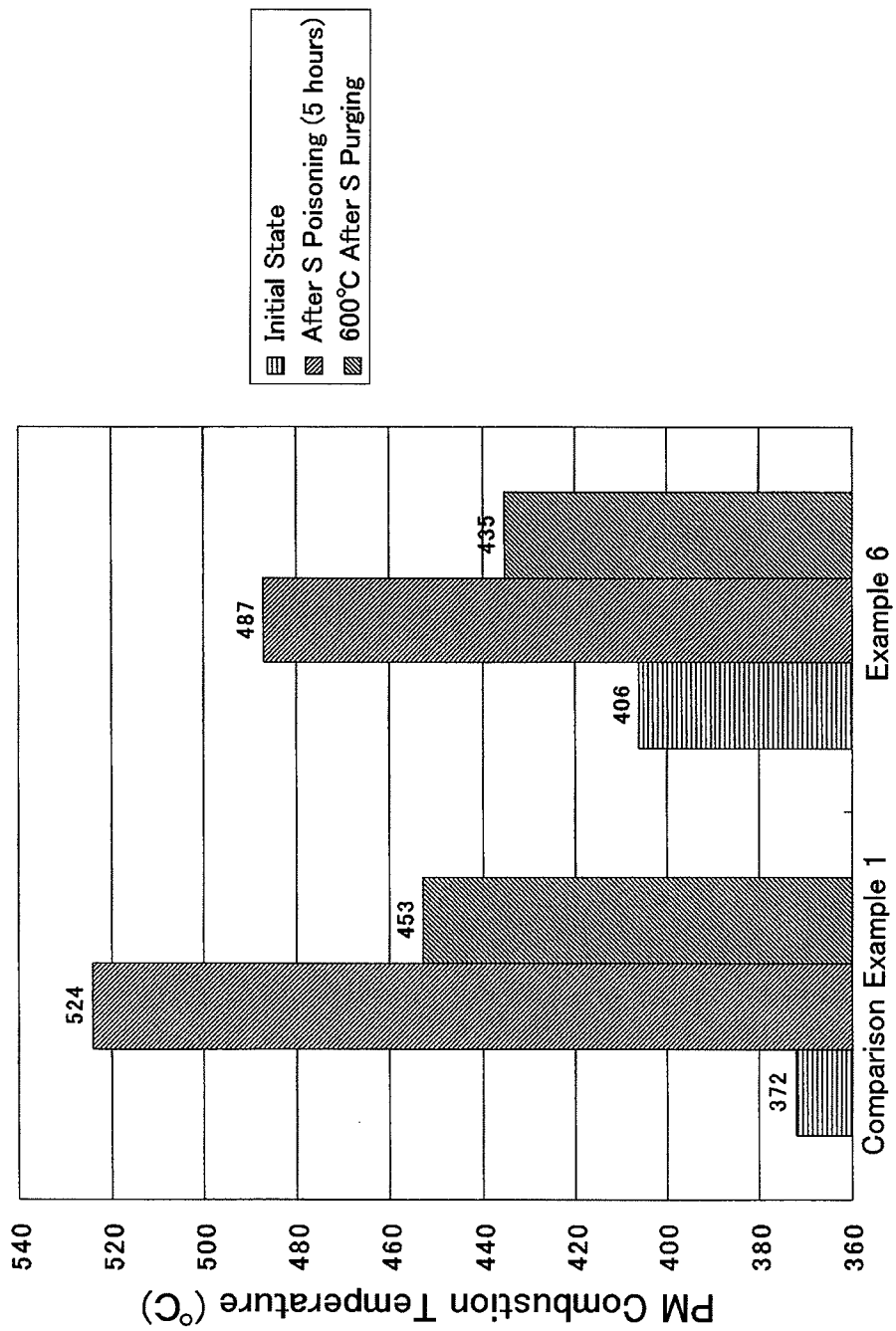
FIG. 5 is a graph that summarizes PM combustion temperatures in Example 6 and Comparative Example 1.

FIG. 5 is a graph summarizing the PM combustion temperatures in Example 6 and Comparative Example 1. The vertical axis represents the PM combustion temperature (° C.), and the results in Comparative Example 1 and Example 6 are plotted on the horizontal axis for the initial state, after S poisoning, and after S purging.

In the composite oxide in Example 6, the initial combustion temperature was slightly higher than that in Comparative Example 1, but the PM combustion temperature after sulfur poisoning (5 hours) was significantly lower than that in Comparative Example 1. This indicates that even when the amount of Bi in the Ce—Bi—Pr—Zr quaternary catalyst is reduced, the sulfur resistance can be improved. When the regeneration treatment was performed at 600° C. after sulfur poisoning, the catalytic activity of the composite oxide in Example 6 was recovered to a PM combustion temperature lower than that in Comparative Example 1.

Figure 6:
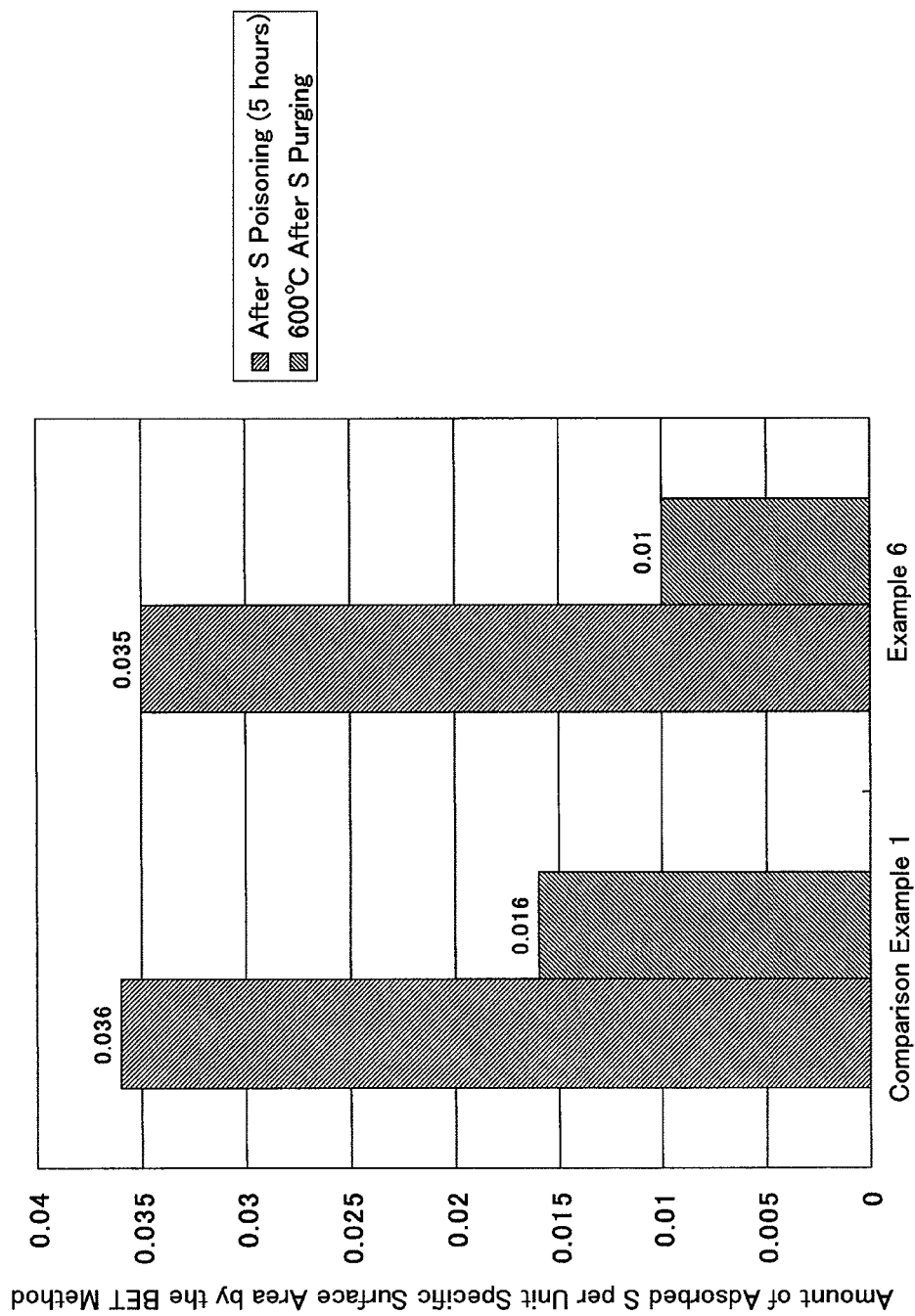
FIG. 6 is a graph that compares the amounts of adsorbed S per unit specific surface area by the BET method.

The amounts of adsorbed S in the composite oxides in Example 6 and Comparative Example 1 were compared using the amounts of adsorbed S per unit specific surface area by the BET method as shown in the graph in FIG. 6 because their BET specific surface areas were different. The vertical axis represents the amount of adsorbed S (mass %/(m²/g)) per unit specific surface area by the BET method, and the results in Comparative Example 1 and Example 6 after S poisoning and after S purging are plotted on the horizontal axis. As can be seen from this graph, immediately after poisoning with sulfur-containing gas for 5 hours, the amounts of adsorbed S in Comparative Example 1 and Example 6 were substantially the same. However, the amount of adsorbed S after the regeneration treatment at 600° C. was smaller in Example 6 than in 8, 13, and 14 elements except for lanthanides and actinides), the composite oxide being represented by the following formula (1):

$$Ce_{1-x-y-z}Bi_xPr_yR_z \quad (1)$$

wherein x, y, and z satisfy x+y+z≤0.5,
wherein 0<x≤0.1, 0<y≤0.25, and 0<z≤0.3 are satisfied.

2. The composite oxide according to claim 1, wherein R is any of Zr and Fe.

3. A coating material for an exhaust gas purification catalyst, the coating material comprising the composite oxide for an exhaust gas purification catalyst according to claim 1.

4. A diesel exhaust gas purification filter comprising:
a porous filter; and
an exhaust gas purification catalyst layer formed on the porous filter and including the composite oxide for an exhaust gas purification catalyst according to claim 1, and an inorganic binder.

5. A coating material for an exhaust gas purification catalyst, the coating material comprising the composite oxide for an exhaust gas purification catalyst according to claim 2.

6. A coating material for an exhaust gas purification catalyst, the coating material comprising the composite oxide for an exhaust gas purification catalyst according to claim 1.

7. A diesel exhaust gas purification filter comprising:
a porous filter; and
an exhaust gas purification catalyst layer formed on the porous filter and including the composite oxide for an exhaust gas purification catalyst according to claim 2, and an inorganic binder.

8. A diesel exhaust gas purification filter comprising:
a porous filter; and
an exhaust gas purification catalyst layer formed on the porous filter and including the composite oxide for an exhaust gas purification catalyst according to claim 1, and an inorganic binder.

9. A composite oxide for an exhaust gas purification catalyst,
the composite oxide comprising Ce, Bi, Pr, and R (wherein R is at least one element selected from group 2, 3, 4, 8, 13, and 14 elements except for lanthanides and actinides), the composite oxide being represented by the following formula (1):

$$Ce_{1-x-y-z}Bi_xPr_yR_z \quad (1)$$

(wherein x, y, and z satisfy x+y+z≤0.5),
the composite oxide produced by a method comprising:
mixing a nitric acid solution in which Ce is dissolved, a nitric acid solution in which Bi is dissolved, a nitric acid solution in which Pr is dissolved, and a nitric acid solution in which R (wherein R is any of Zr and Fe) is dissolved to obtain a mixed solution; and
mixing the mixed solution with an alkali hydroxide and/or an alkali carbonate to obtain a precipitate,
wherein 0<x≤0.1, 0<y≤0.25, and 0<z≤0.3 are satisfied.

* * * * *